W. P. CASEY.

SASH TOOL OR THE LIKE.

APPLICATION FILED MAY 24, 1920.

Reissued Dec. 28, 1920. 15,016.

INVENTOR.
William P. Casey.
BY Morsell & Keeney.
ATTORNEYS.

UNITED STATES PATENT OFFICE.

WILLIAM P. CASEY, OF OSHKOSH, WISCONSIN, ASSIGNOR TO THE ROUTER MANUFACTURING COMPANY, OF OSHKOSH, WISCONSIN.

SASH-TOOL OR THE LIKE.

15,016. Specification of Reissued Letters Patent. Reissued Dec. 28, 1920.

Original No. 1,268,215, dated June 4, 1918, Serial No. 193,049, filed September 24, 1917. Application for reissue filed May 24, 1920. Serial No. 383,961.

*To all whom it may concern:*

Be it known that I, WILLIAM P. CASEY, a citizen of the United States, residing at Oshkosh, in the county of Winnebago and State of Wisconsin, have invented new and useful Improvements in Sash-Tools or the like, of which the following is a specification.

The invention relates to a new and useful sash or general utility tool and has for one of its objects the removing of putty from window sash.

Another object of this invention is to provide a compact unitary tool for general utility work and capable of transportation from one piece of work to another.

A further object is to provide a device that can be operated by either hand or power means and at the same time have a light and efficient tool.

A further object of this invention is to provide a general utility tool capable of use as a putty remover as described, as a portable hand milling machine, or as a cutter for any work where it will perform its functions in an efficient manner.

A still further object of this invention is to provide a general utility tool having means for adjusting the distance at which the cutting tool proper extends below the surface of the material being worked whereby the depth of the cut may be varied.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

Figure 1:
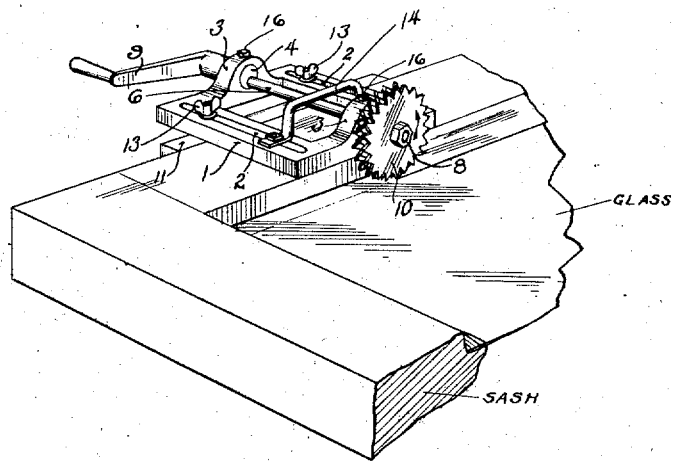
Figure 2:
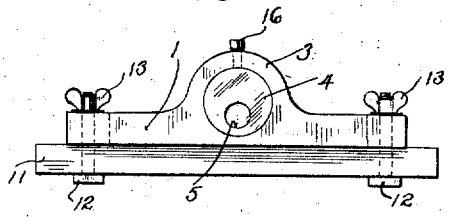
Figure 3:
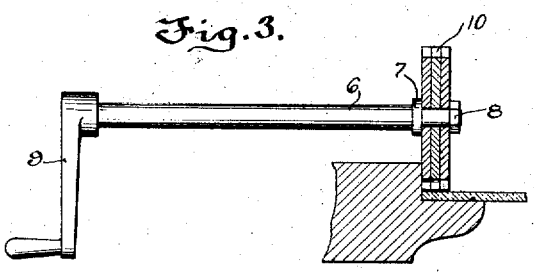
Figure 4:
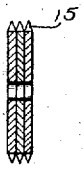

In the accompanying drawing I have illustrated one complete example of the physical embodiment of my invention constructed according to the best mode I have so far devised for the practical application of the principles thereof, and in which:

In the drawings Figure 1 is a perspective view of the tool in operation upon a sash for removing the putty retaining the glass therein; Fig. 2 an end view of the tool frame; Fig. 3 a detail of one form of the cutter and shaft; Fig. 4 a sectional view of a modified cutter and Fig. 5 an end view of the cutter.

The tool comprises a frame 1 which may be of substantially rectangular form having longitudinal slots 2 formed therein and bearing bosses 3 formed therewith. The bosses 3 are bored axially to a comparatively large hole and eccentric bushings 4 are fitted therein, the bushings have a bearing hole 5 offset from the center for the purpose of varying the position of the axis of the bearing 5 to adjust the same toward or away from the face of the frame which is engageable with the material to be worked upon.

Figure 5:
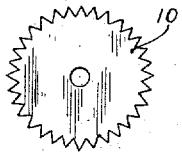

A shaft 6 is fitted to journal in the bearing holes 5 and has a shoulder 7 and nut 8 on one end and an actuating crank 9 fitted to the other end. One or more toothed cutters 10 are fitted on the shaft 6 against the shoulder 7 and secured thereon by means of the nut 8. The cutters are preferably made in three sections and punched from sheet metal, so the teeth may be divided or broken in their regularity which is found to give better cutting qualities, the teeth being formed as shown in Fig. 5. However it will be readily apparent that if desired but one cutter may be employed to better adapt the tool for different kinds of work. The shaft 6 is journaled in the bushings 4 when assembled as shown in Fig. 1 so that by revolving the crank 9 the cutters 10 are also revolved.

For gaging the position of the tool when in use a gage 11 is fitted to the under side of the frame 1 and secured against same by means of bolts 12 and thumb nuts 13 so that the position can be set to suit the work.

For the purpose of feeding the tool along a handle 14 is fitted on the frame and held by bolts to the slots 2 so it can be readily adjusted or varied to give the proper balance of forces.

In case it should be desired to actuate the device by turning the crank in the opposite direction, or to the right a pair of gears can be mounted one on the shaft 6 and another fitted to the crank which can be journaled thereabove.

In some cases where putty is very hard to remove it has been found that the replacing of the standard cutter with a set of cutters of the modified form shown in Fig. 4 will effect more satisfactory results. These are made similar to the cutters 10 except the teeth are beveled on their sides at 15. The flat teeth, however, are used where the material to be removed is not too hard.

In operation, the frame is rested on the window sash or other material being worked upon and the gage 11 is set so the cutter will cover the path of the putty or the line in the material where it is desired to have the cutting tool remove the material and the eccentric bushings 4 turned to give the proper depth of cut, as for instance, when the tool is used to remove the hard putty from a sash just so the teeth will clear the glass as shown in Fig. 3.

The crank is now turned while the frame is being pushed along and the cutter engages the putty and removes it in a clean fashion, the tins or points are also removed so that by moving this tool once around the sash the glass can be lifted out.

While the tool is shown in hand form it is obvious that it can be driven by power by attaching a flexible shaft to the shaft 6 in place of the crank 9 or any other convenient mechanical connection or transmission. The set screws 16 are for locking the eccentric bushings when properly adjusted and as most sash has a standard depth this adjustment is seldom required.

As will be apparent to those skilled in the art to which an invention of this character appertains my improved tool may be employed in connection with any type of work where a portable tool is desired and is also especially adapted for cutting openings in floors or the like, in general repair work, and in fact may be used as a general wood working tool.

I claim:

1. A sash tool comprising a frame, a guiding attachment adjustably fitted to the frame, a revoluble shaft journaled in the frame and having toothed cutters removably attached thereto, and means for laterally adjusting the axis of the shaft within the frame comprising eccentric bushings fitted between the shaft, and frame.

2. A sash tool comprising a frame, a guide adjustably fitted thereto, a cutter shaft journaled in the frame, the said shaft being capable of adjustment with reference to the frame, and an adjustable handle fitted to the frame.

3. In a sash tool the combination with a frame having a handle attached thereto, a guiding device adjustably attached thereto, eccentric bushings fitted in the frame, a shaft journaled in the bushings and having a cutter mounted thereon and means for actuating the shaft.

4. A tool comprising a frame constructed to be guided over the material to be worked upon, a member revolubly mounted in said frame, a shaft journaled in said member to one side of the center thereof whereby rotation of said member will adjust said shaft with respect to said frame, a tool securable to said shaft, and means for rotating said shaft.

In testimony that I claim the foregoing as my own, I have hereto affixed my signature in the presence of two witnesses.

WILLIAM P. CASEY.

Witnesses:

BART W. HEISS,

MARGARET BUNITT.